(12) United States Patent
O'Neal

(10) Patent No.: US 9,591,924 B1
(45) Date of Patent: Mar. 14, 2017

(54) MULTIPLE USE DEVICE

(71) Applicant: Anthony W. O'Neal, Waycross, GA (US)

(72) Inventor: Anthony W. O'Neal, Waycross, GA (US)

(*) Notice: Subject to any disclaimer, the term of this patent is extended or adjusted under 35 U.S.C. 154(b) by 37 days.

(21) Appl. No.: 14/745,706

(22) Filed: Jun. 22, 2015

Related U.S. Application Data

(63) Continuation-in-part of application No. 29/491,406, filed on May 21, 2014, now Pat. No. Des. 734,441.

(51) Int. Cl.
| | |
|---|---|
| *A47C 4/00* | (2006.01) |
| *A47C 13/00* | (2006.01) |
| *A47C 7/62* | (2006.01) |
| *A47C 7/66* | (2006.01) |
| *A47C 29/00* | (2006.01) |
| *A47B 85/04* | (2006.01) |
| *A45F 4/02* | (2006.01) |
| *A45F 4/04* | (2006.01) |
| *F41C 27/22* | (2006.01) |
| *A47K 11/04* | (2006.01) |
| *A47K 11/06* | (2006.01) |
| *A47C 31/11* | (2006.01) |
| *A47C 1/14* | (2006.01) |
| *A47C 4/04* | (2006.01) |
| *A01K 97/10* | (2006.01) |
| *F41A 23/02* | (2006.01) |

(52) U.S. Cl.
CPC .............. *A47C 1/14* (2013.01); *A01K 97/10* (2013.01); *A47C 4/04* (2013.01); *A47C 7/62* (2013.01); *A47C 7/66* (2013.01); *A47K 11/04* (2013.01); *F41A 23/02* (2013.01)

(58) Field of Classification Search
CPC .... A47C 1/14; A47C 7/62; A47C 7/66; A47C 4/04; A47K 11/04; A01K 97/10; F41A 23/02
USPC .......... 297/17, 118, 119, 129, 130, 184, 14, 297/184.15, 184.16, 188.08, 227–229, 297/378.1; 224/153, 155; 4/239, 479, 4/483, 484; 42/94
See application file for complete search history.

(56) References Cited

U.S. PATENT DOCUMENTS

| | | | | |
|---|---|---|---|---|
| 1,049,394 | A * | 1/1913 | Predock ................... | A47C 7/62 297/118 |
| 1,673,988 | A * | 6/1928 | Nitti ......................... | A47C 4/52 297/17 X |
| 1,947,940 | A * | 2/1934 | Isom ....................... | A47K 11/04 4/483 X |
| 2,073,390 | A * | 3/1937 | Giblette ................. | A47K 11/04 4/483 X |
| 2,483,309 | A * | 9/1949 | Amaducci ................ | A47C 4/10 297/125 |

(Continued)

*Primary Examiner* — Rodney B White
(74) *Attorney, Agent, or Firm* — Jonathan R. Smith; Jonathan Rigdon Smith, J.D., PC

(57) ABSTRACT

Multifunctional device can be used, inter alia, as a stool, table, bench, or toilet, and can be carried on one's back. There are also many accessories that, in embodiments, are added to the basic structure, such as a back rest, a shooting stick with adjustable height, an umbrella, a hunting blind attachment, a privacy skirt, and toilet paper holders. The basic structure contains, in embodiments, shaped functionality for propping elongate items, e.g., a rifle or fishing pole.

6 Claims, 23 Drawing Sheets

(56) References Cited

U.S. PATENT DOCUMENTS

| | | | | |
|---|---|---|---|---|
| 2,729,276 A * | 1/1956 | Volney | A47C 4/52 | 297/17 |
| 3,544,157 A * | 12/1970 | Muller | A45C 9/00 | 297/118 |
| 3,662,932 A * | 5/1972 | Kerschner | A45F 4/02 | 297/17 X |
| 3,674,306 A * | 7/1972 | Botney | A47C 4/52 | 297/17 |
| 3,873,114 A * | 3/1975 | Brown | B62B 3/02 | 297/118 X |
| 4,052,087 A * | 10/1977 | Gagliardi | A47K 11/04 | 297/60 X |
| 4,191,420 A * | 3/1980 | Fassett | A47C 7/62 | 297/17 |
| 4,282,613 A * | 8/1981 | Violante | A61G 7/02 | 297/118 |
| 4,617,869 A * | 10/1986 | Denomey | A47B 3/08 | 297/42 X |
| 4,925,245 A * | 5/1990 | Pendleton | A47C 17/14 | 297/188.11 X |
| 5,318,342 A * | 6/1994 | Hale | A47C 4/52 | 297/129 |
| 5,350,215 A * | 9/1994 | DeMars | A47C 7/66 | 297/129 |
| 5,375,905 A * | 12/1994 | Flitter | A01M 31/02 | 297/17 X |
| 5,409,291 A * | 4/1995 | Lamb | A01K 97/10 | 224/155 |
| 5,499,760 A * | 3/1996 | Pielocik | A47C 13/00 | 224/155 |
| 5,628,544 A * | 5/1997 | Goodman | A47C 1/14 | 297/17 X |
| 5,632,068 A * | 5/1997 | Riley | A47C 31/11 | 297/228.11 X |
| 5,647,632 A * | 7/1997 | Fireman | A47C 13/00 | 297/118 X |
| 6,079,599 A * | 6/2000 | Nordstrom | A45C 11/20 | 224/153 |
| 6,402,231 B1 * | 6/2002 | Pedemonte | A45F 4/02 | 224/155 |
| 7,427,101 B1 * | 9/2008 | Zernov | A47C 7/66 | 297/184.14 |
| 7,497,514 B2 * | 3/2009 | Ramsey | A47C 4/52 | 297/17 |
| 7,849,866 B1 * | 12/2010 | Mangum | A47K 11/04 | 297/16.2 X |
| 8,459,734 B2 * | 6/2013 | Herschler | A47B 83/02 | 297/17 X |
| 8,528,976 B2 * | 9/2013 | Wimberley | B60N 2/01508 | 297/378.1 X |
| 2002/0149240 A1 * | 10/2002 | Minneman | A01M 31/025 | 297/188.01 |
| 2006/0220424 A1 * | 10/2006 | Fargason | A01K 97/01 | 297/184.17 |
| 2008/0084104 A1 * | 4/2008 | VanHorn | A47C 7/546 | 297/452.4 |
| 2009/0039685 A1 * | 2/2009 | Zernov | A47C 7/66 | 297/184.14 X |
| 2010/0301639 A1 * | 12/2010 | McPheeters | A61G 9/003 | 297/118 |
| 2014/0368002 A1 * | 12/2014 | Parton | A47C 4/286 | 297/16.1 |

* cited by examiner

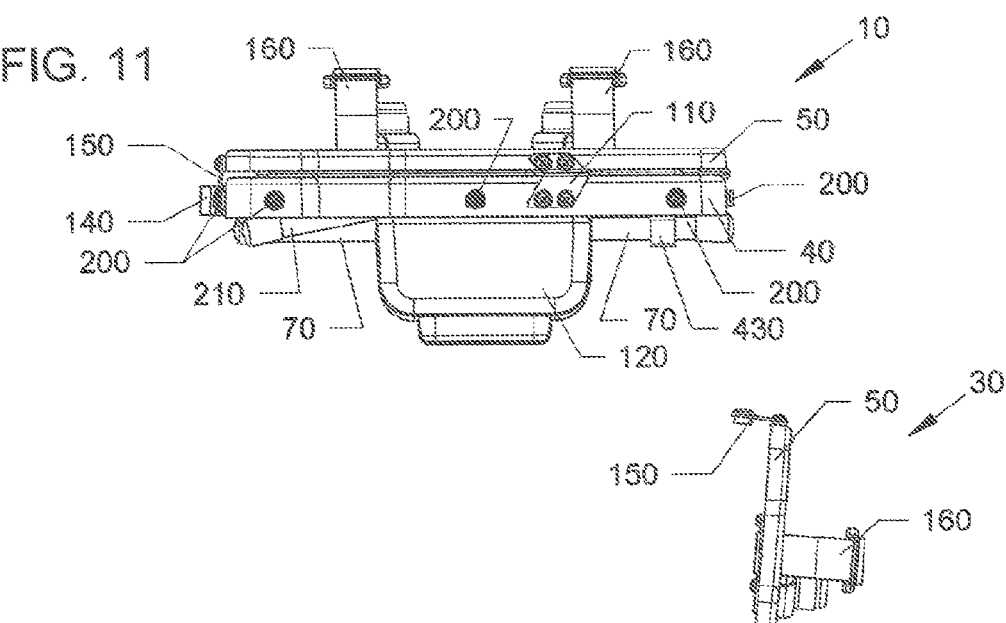
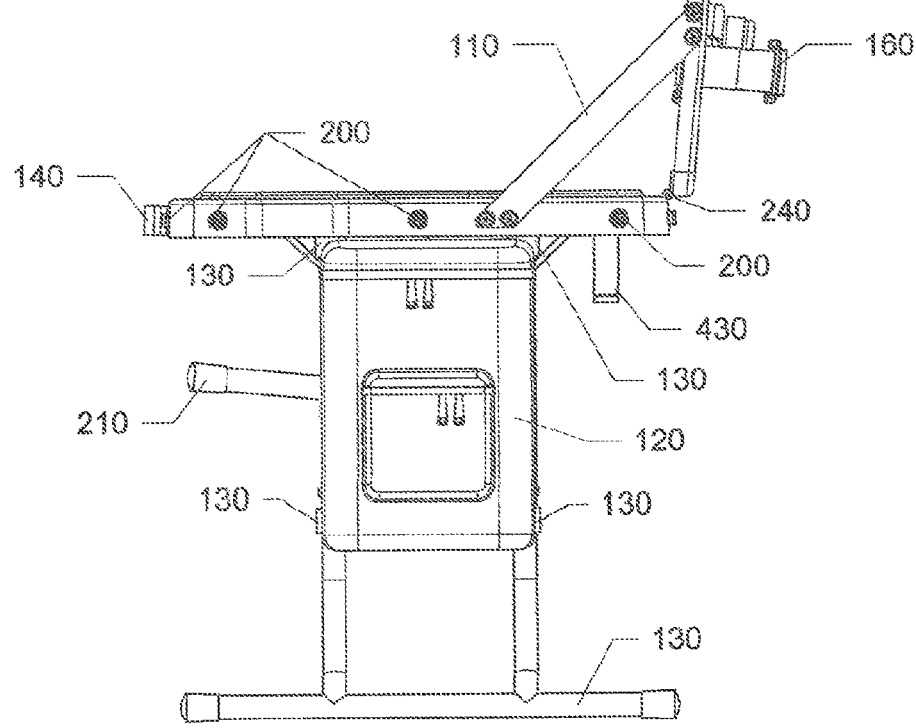

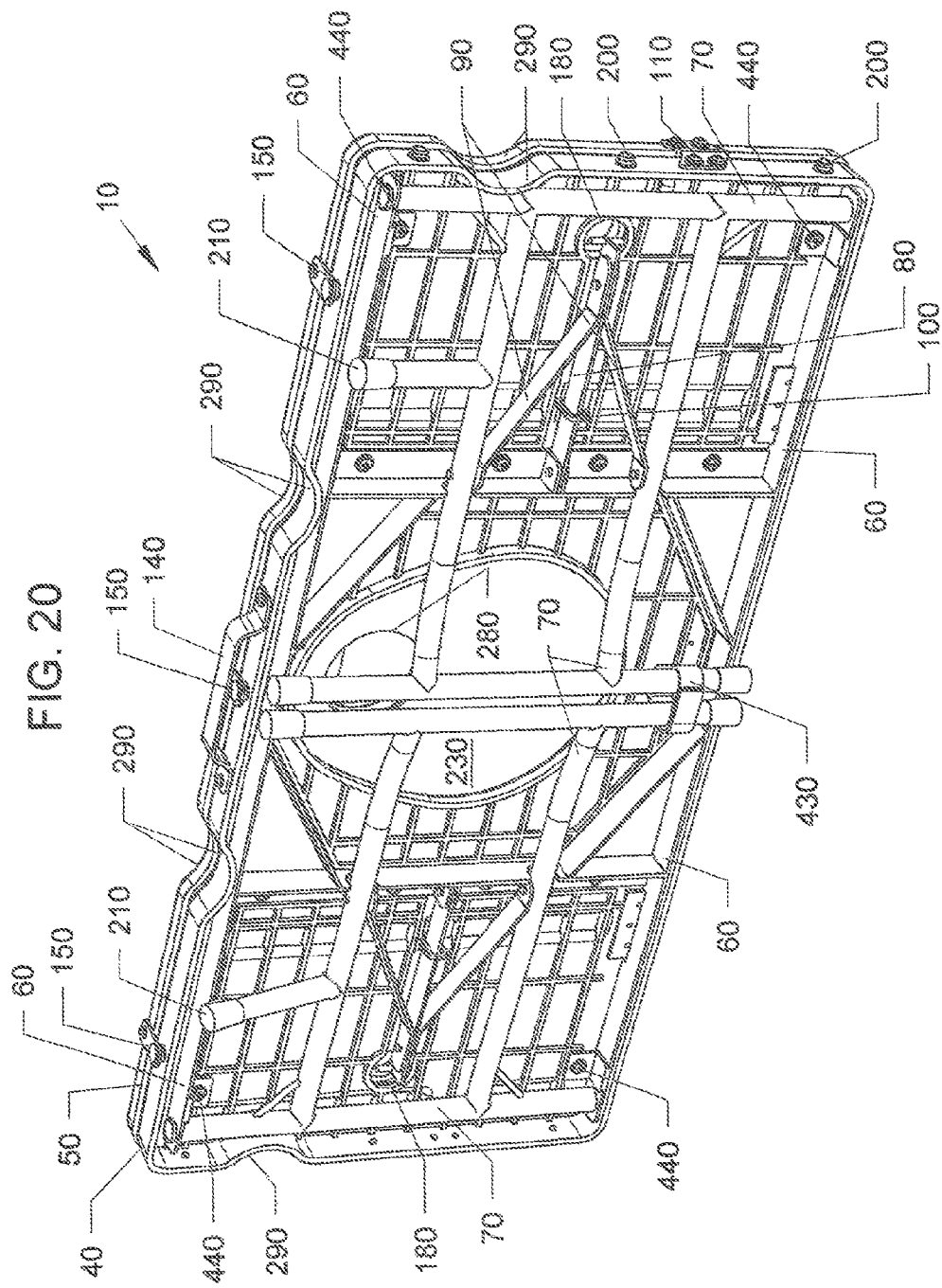

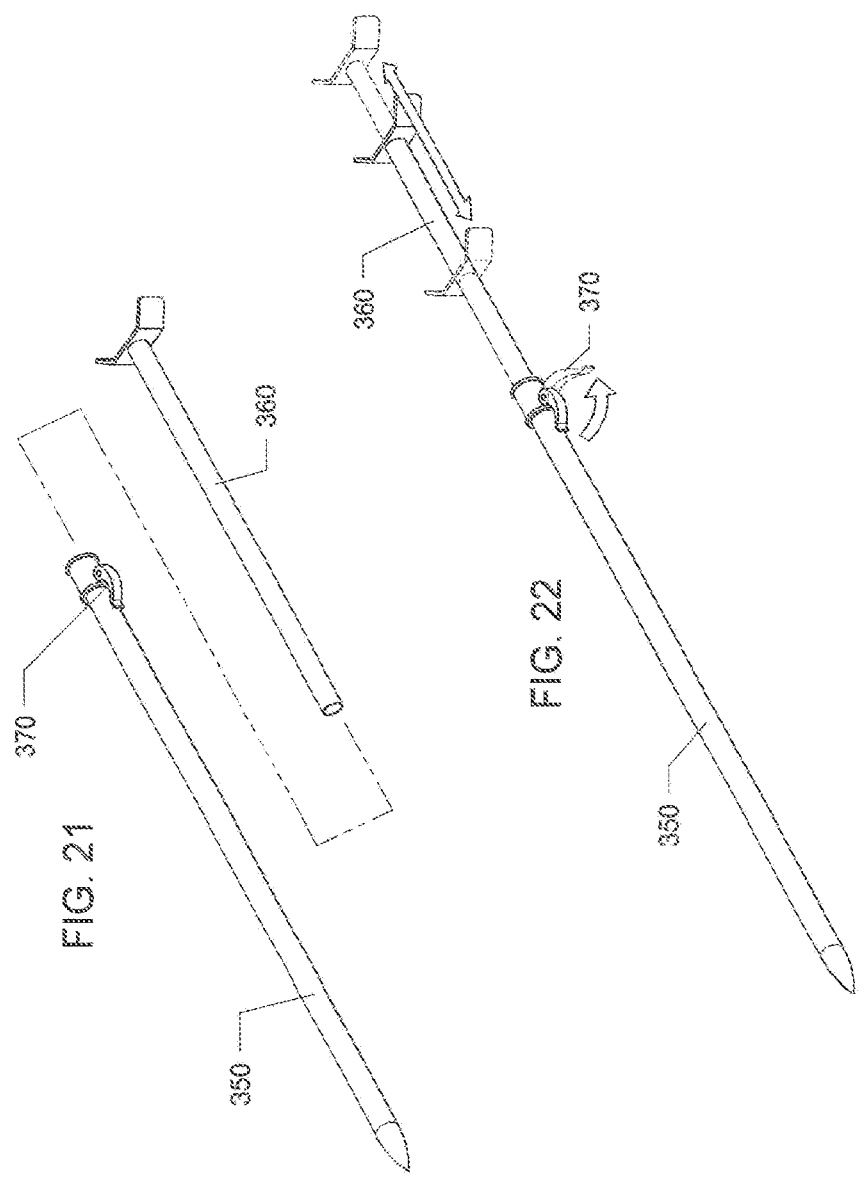

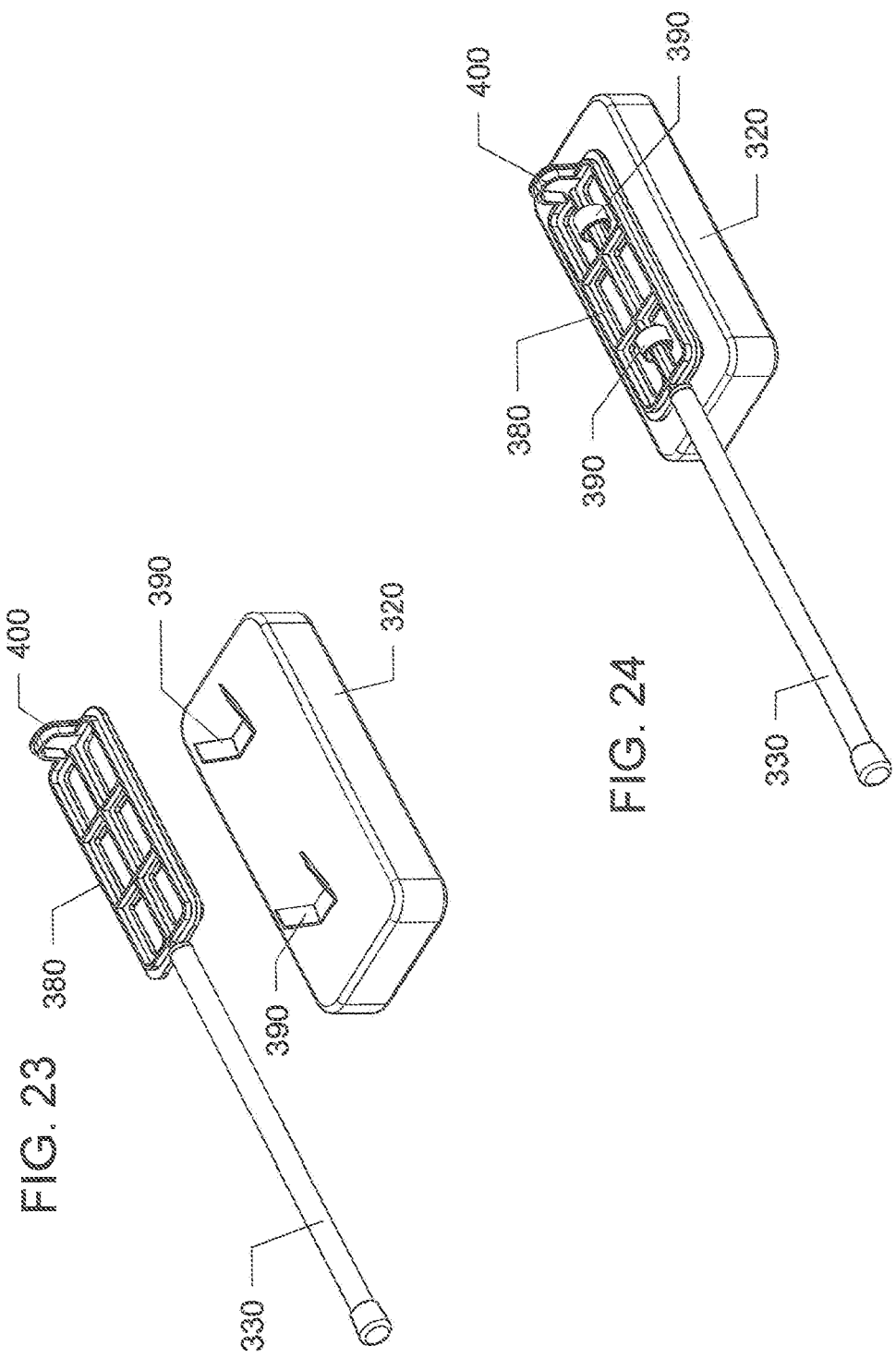

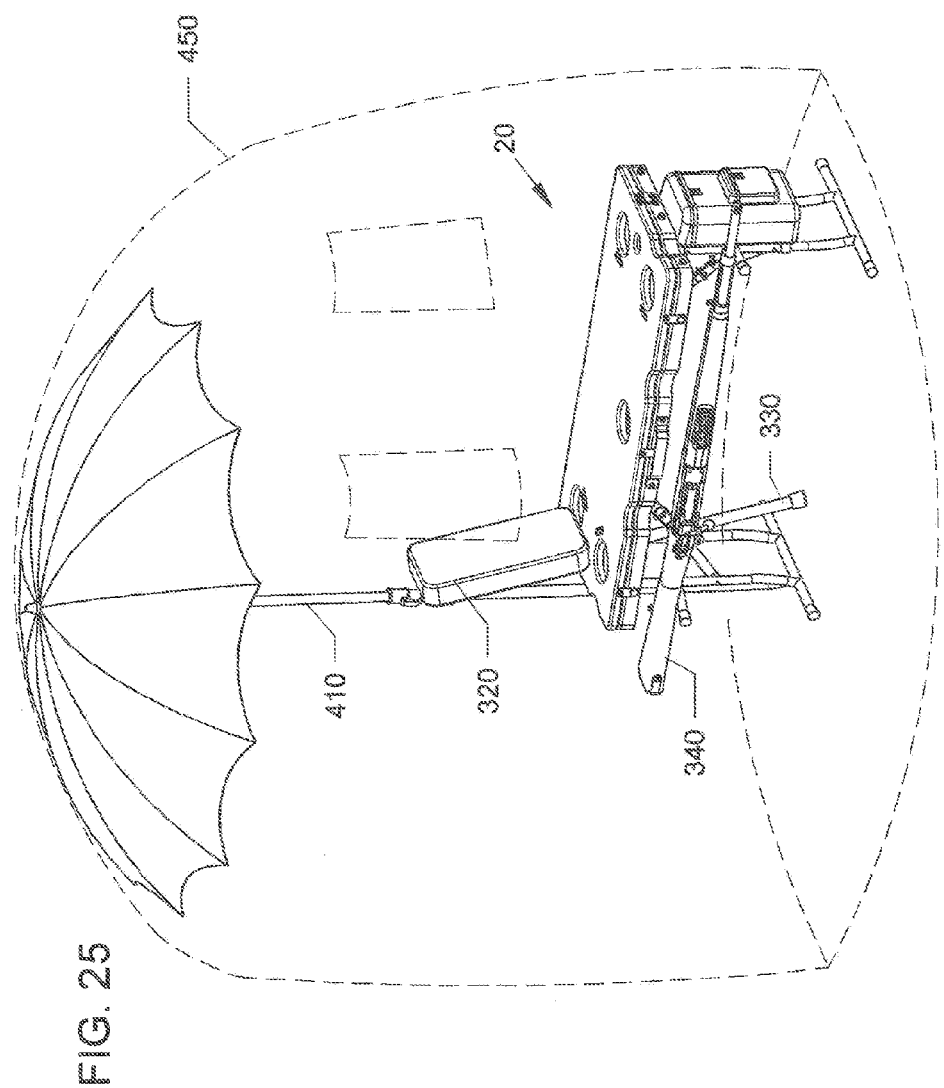

MULTIPLE USE DEVICE

CROSS-REFERENCES TO RELATED APPLICATIONS

This non-provisional utility patent application claims priority of U.S. design application Ser. No. 29/491,406, filed May 21, 2014.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A BIOLOGICAL SEQUENCE LISTING

Not applicable.

BACKGROUND OF INVENTION

Field of the Invention

This invention is in the fields of: horizontal supports, more specifically, chairs, tables, and benches; and camping, hunting and fishing equipment.

Description of the Related Art

The related art describes foldable chairs and benches of various types. U.S. Pat. No. 7,434,874 to Jordan describes a bench/table combination suitable for picnic tables and the like which is easily collapsible and is strong when erected. The folding action allows the table top, legs and benches to be folded to assume a generally vertical position, the table top being made of two halves and hinged about a central axis, a pair of legs attached to each table top half and being pivotally attached to their respective table top half, and bench supports extending between each pair of legs being pivotally attached to the legs.

A familiar sight in outdoor environments around the United States is the foldable beach chair with the amenity of one or more cup holders in the arm rests. There are patented foldable seats or benches comprising other amenities, such as U.S. Pat. No. 7,648,196 to Degelman, et al., which describes an elongate seat or bench with a back rest and sheltering canopy. It comprises a collapsible bench and canopy having a seat frame made up of a plurality of crossing pairs of seat tubes pivotally connected to each other supporting a fabric seat. A fabric back rest is supported by back tubes attached to the seat frame and a canopy is supported by the back tubes to provide shelter to occupants of the collapsible bench. The bench and canopy can be collapsed in one piece by pivoting down the canopy and then moving the crossing pairs of seat tubes so that each pair is substantially aligned. U.S. Pat. No. 6,009,571 to Battiston et al. describes a foldable chair that can be used as a commode. This device comprises a platform having a pair of slotted members depending from the bottom, each slotted member defining a race extending from front to rear; a first U-shaped leg member having a pair of legs connected by a bight portion slidably disposed in the races; a second U-shaped leg member having a pair of legs connected by a bight portion, the top portions being pivotally mounted on opposite sides of the rear end of the platform, wherein the middle portion of each of the legs of the second U-shaped leg member is pivotally attached to the middle portion of a respective one of the legs of the first U-shaped leg member; a receptacle support member disposed intermediate the front and rear ends of the platform; and a receptacle which depends from the receptacle support member.

BRIEF DESCRIPTION OF THE INVENTION

Objects of the Invention

Our increasingly outdoor and sports-oriented culture demands not only portable equipment related to specific activities such as climbing, beach-going and camping, but also has created a need to support the involvement of individuals and small groups in one or more such activities without the burdens of (a) having to decide for each occasion which portable devices pertain to a given outing; (b) making sure they are gathered together and packed for the occasion; and (c) making sure the packed gear, which the prior art may or may not have provided in portable form, is portable. The principal object of the present invention is to satisfy this need.

SUMMARY OF THE INVENTION

The present invention is a multifunctional device that can be used, inter alia, as a stool, table, bench, or toilet, and that can be carried on one's back. There are also many accessories that, in embodiments, can be added to the basic structure, such as a back rest, a shooting stick with adjustable height, an umbrella, a hunting blind attachment, a privacy skirt, and toilet paper holders. The basic structure contains, in embodiments, shaped functionality for propping elongate items, e.g., a rifle or fishing pole.

Other uses for the various embodiments will become evident as the invention is described more fully below.

BRIEF DESCRIPTION OF THE DRAWINGS

1. Top perspective of present invention in folded configuration.
2.

19. Bottom view of FIG. 17.

20. Bottom perspective view of FIG. 17.

21. View showing the accessory support pole and the gun rest support apart.

22. View showing the support pole and the gun rest assembled.

23. View showing the back rest support pole and back rest cushion apart.

24. View showing the back rest support pole and back rest cushion assembled.

25. Perspective view showing the accessory hunting blind draped over the bench and umbrella.

26. Perspective view showing the accessory skirt ready to be assembled to the bench.

27. Perspective view showing skirt assembled to bench.

28. Perspective view showing a rifle and a fishing pole resting in the rests cut into the bench.

DETAILED DESCRIPTION OF THE INVENTION

Figure 1:
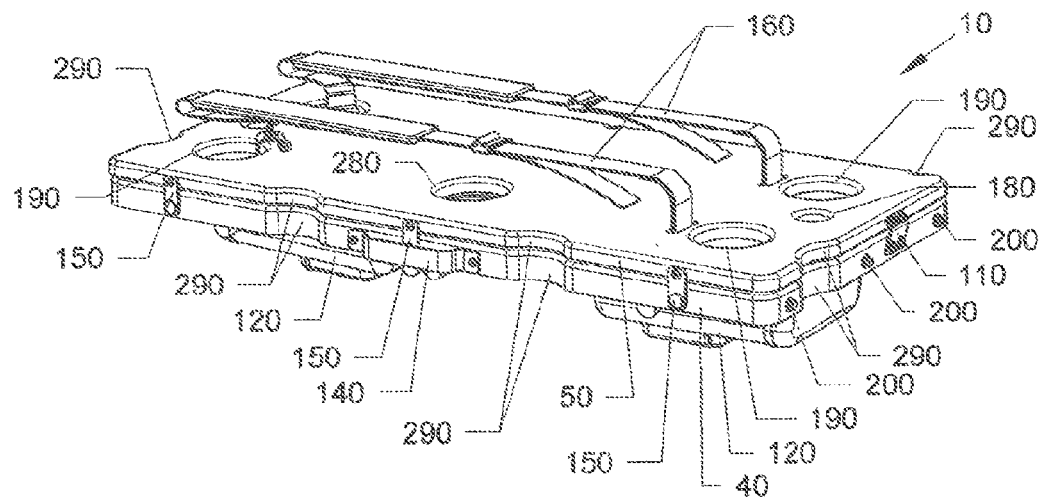
FIG. 1 with the legs unfolded.
3.

Referring now to the drawings, in which like reference characters refer to like elements among the drawings, FIG. 1 shows a top perspective view of the first embodiment 10 of the present invention, folded configuration. Features visible in this view are bench seat 40, bench back 50, fabric or flexible plastic bench back support folds 110 when bench is in the "back down" configuration, auxiliary gear bags 120 and straps 130 for fastening same to legs (not visible in this view), and carrying handle 140. Straps with snaps 150 ensure that bench-back remains secured to bench seat when in "back down" configuration. Shoulder straps 160 to be used for carrying like a backpack are shown here. Also visible are cup holder ports 190 (in bench back only), accessory male snap fittings 200 for skirt, blind, etc. (see below), accessory pole support ports 180 in bench seat and bench back (which can be used for lamp hangers, tiki or insect repellent torches) and gun and fishing rod rests 290, which are cut into both the bench seat and the bench back.

Figure 2:
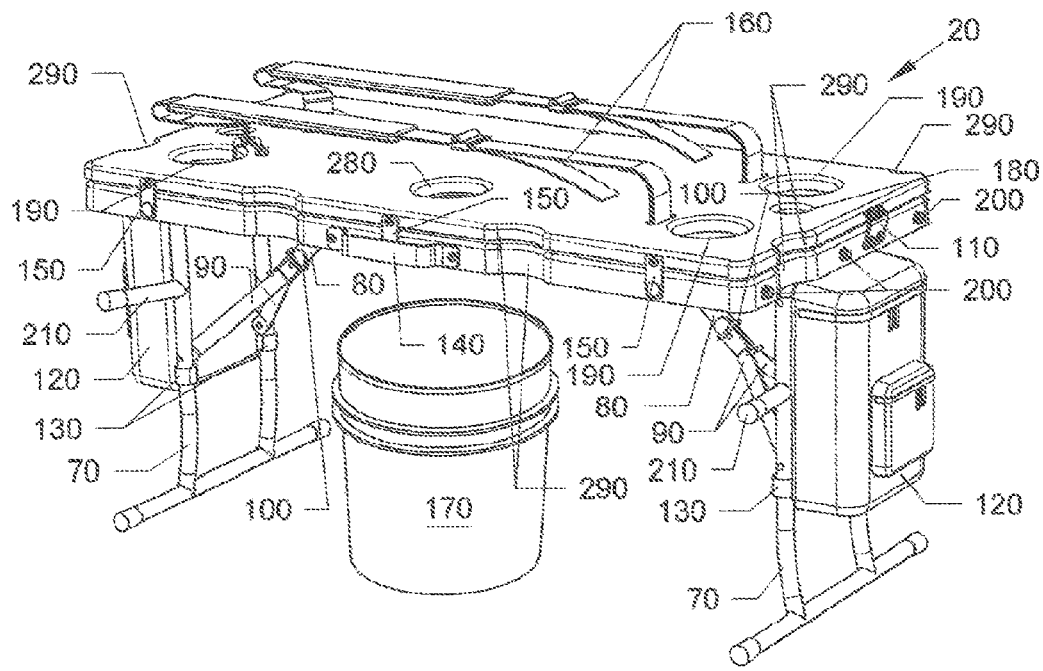
FIG. 2 with the bench-back in the raised position.
4.

FIG. 2. shows the features of FIG. 1 with legs 70 unfolded for use as a second embodiment 20.

Legs 70 are deployed using leg brace 80 and leg strut 90 restrained by leg lock ring 100. An accessory bucket 170 and gear bags 120 are also visible, fastened to legs 70 with, e.g., Velcro® straps 130.

Figure 3:
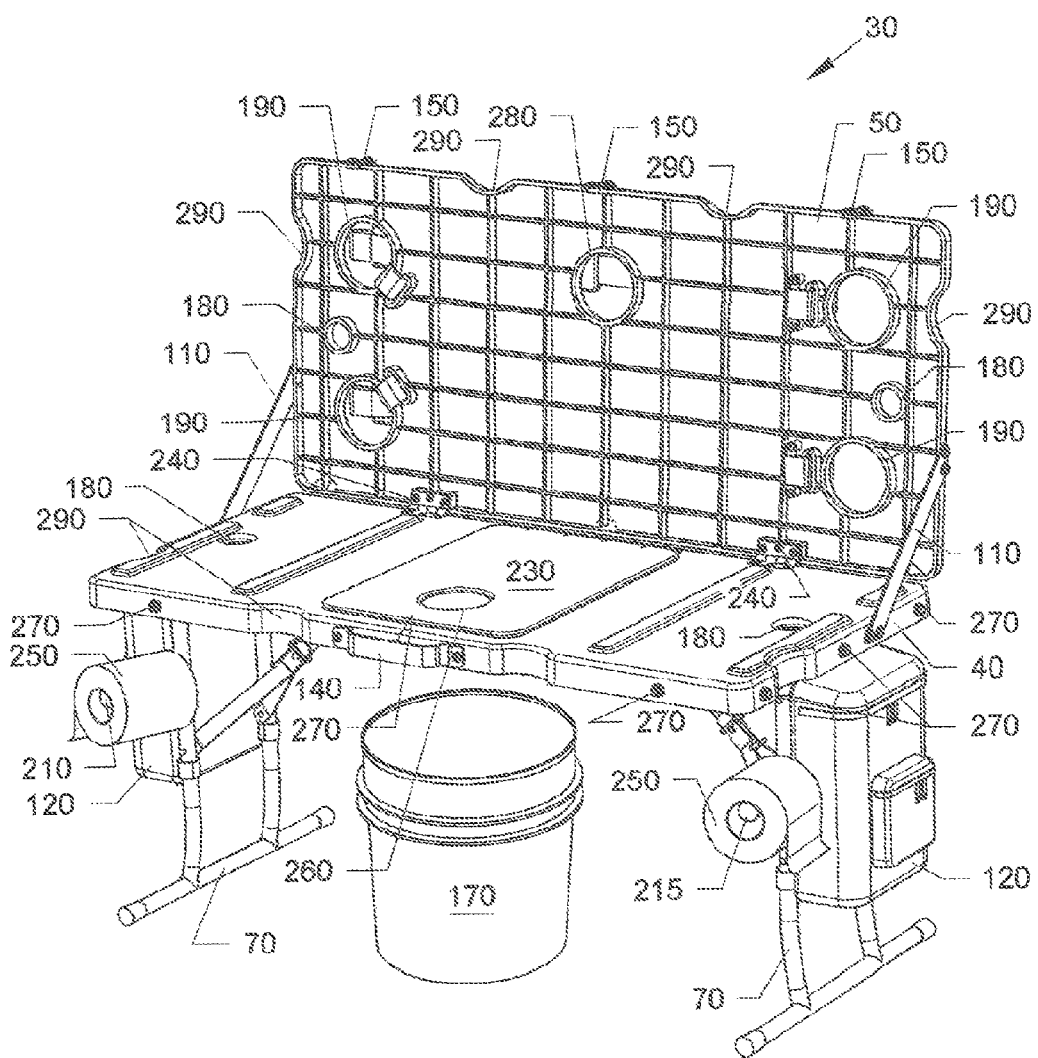
FIG. 3 with the toilet seat open.
5. View of a person with the folded bench portable strapped to his back. Accessories can be seen strapped to the back of the folded bench using Velcro straps, rope, or the like.
6. View of a person using the gun rest.
7. Perspective view of the bench with the legs unfolded showing the accessory back rest, drink holder, and umbrella.
8. Rear detail of FIG. 7 highlighting the umbrella mounting as well as how the back rest support pole nests between the leg struts giving it stability.
9. Front view of bench with the legs down and the bench-back up.
10. rear view of FIG. 9.
11. Side view of folded bench.
12. Side view of FIG. 9.
13. Top view of FIG. 9.
14. Bottom view of FIG. 9.
15. Bottom perspective view of the bench with the legs down and the bench-back up.
16. Detail of leg lock components.
17. Top view of bench in folded configuration.
18. Front view of FIG. 17.

FIG. 3. shows FIG. 2 with the bench-back 50 in the raised position in accordance with the third embodiment of the present invention. Hinged toilet lid 230 is visible, which normally fully covers the toilet opening (see FIG. 4). However, lid 230 is equipped with a trash or game cut-out 260 separate from the toilet which can be used for disposing trash or putting away game while seated anywhere on the bench 40. Seat back cut-out 280 aligns vertically with cut-out 260 to allow trash or game to be handled with the seat back down. Bench-back hinges 240 are also visible in this view. Support struts 210 and 215 are shown here holding rolls of toilet paper 250 but they may be used to support gun or fishing rod racks. Additional male snap fittings 270 are also visible, placed for use in securing accessories as described below.

Figure 4:
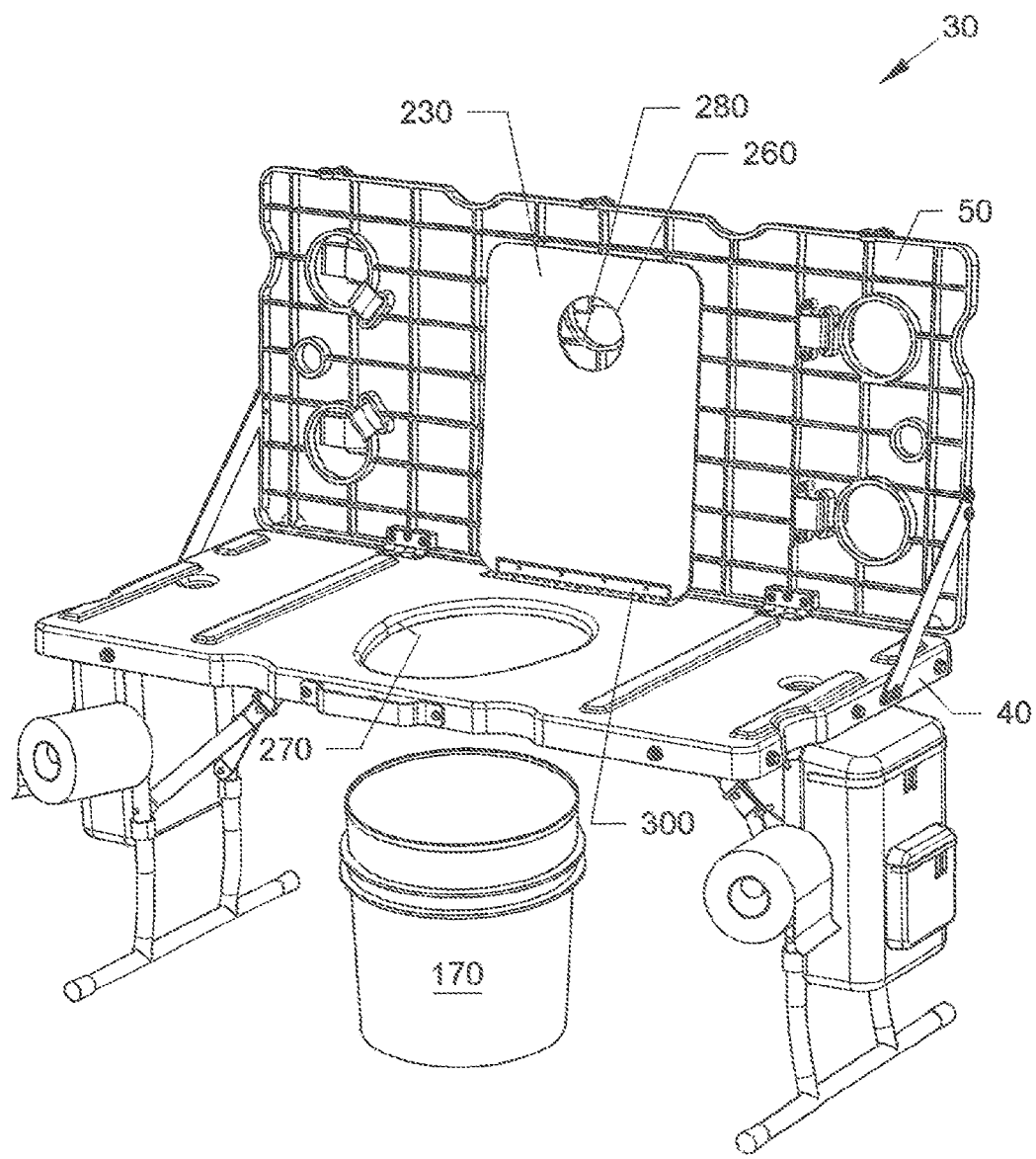

FIG. 4. shows FIG. 3 with hinged toilet seat lid 230 raised making toilet cut-out 220 available. Toilet lid hinge 300 is shown as well.

Figure 5:
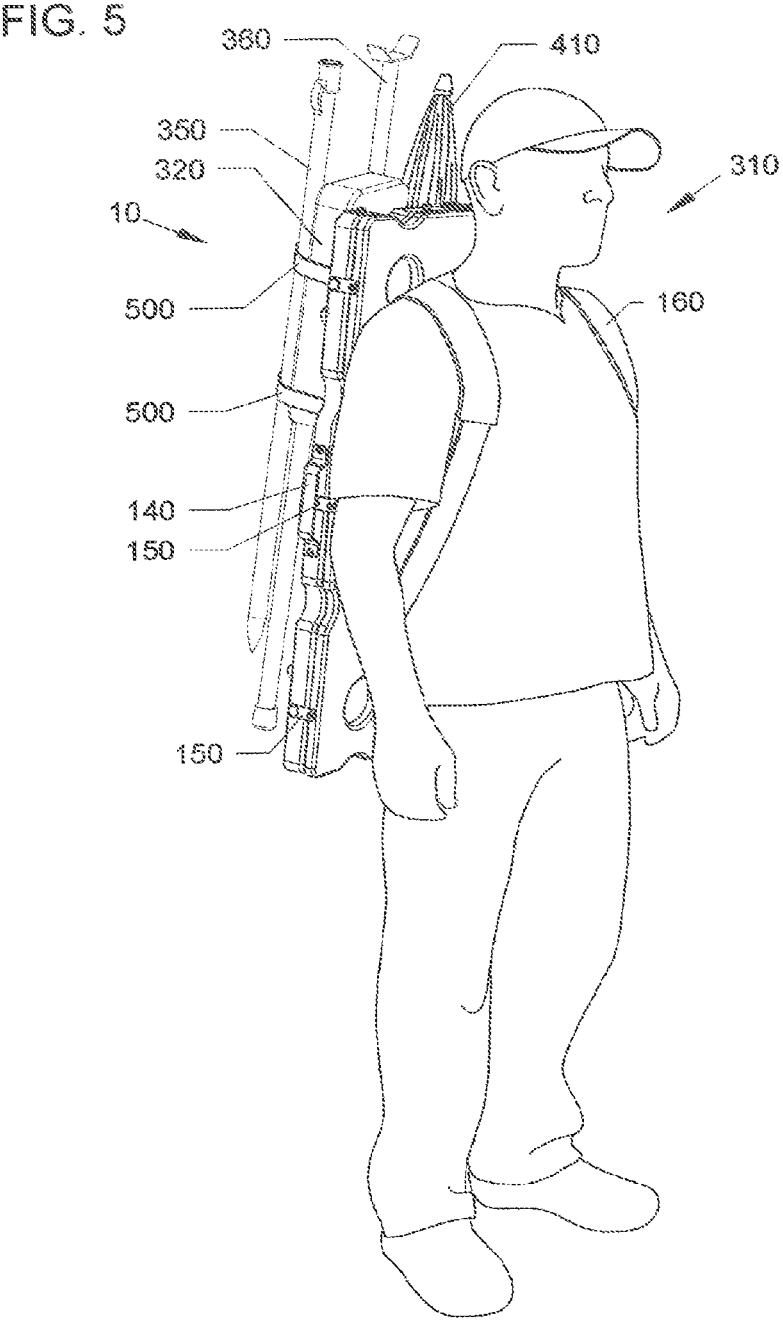

FIG. 5. is a view of a person 310 with the portable folded bench first embodiment 10 strapped to his back. Accessories such as, by example and not limitation, support pole 350, gun rest 360, back rest cushion 320, and umbrella 410 can be seen strapped to the back of the folded bench using Velcro® or other straps, rope, or cords 500.

Figure 6:
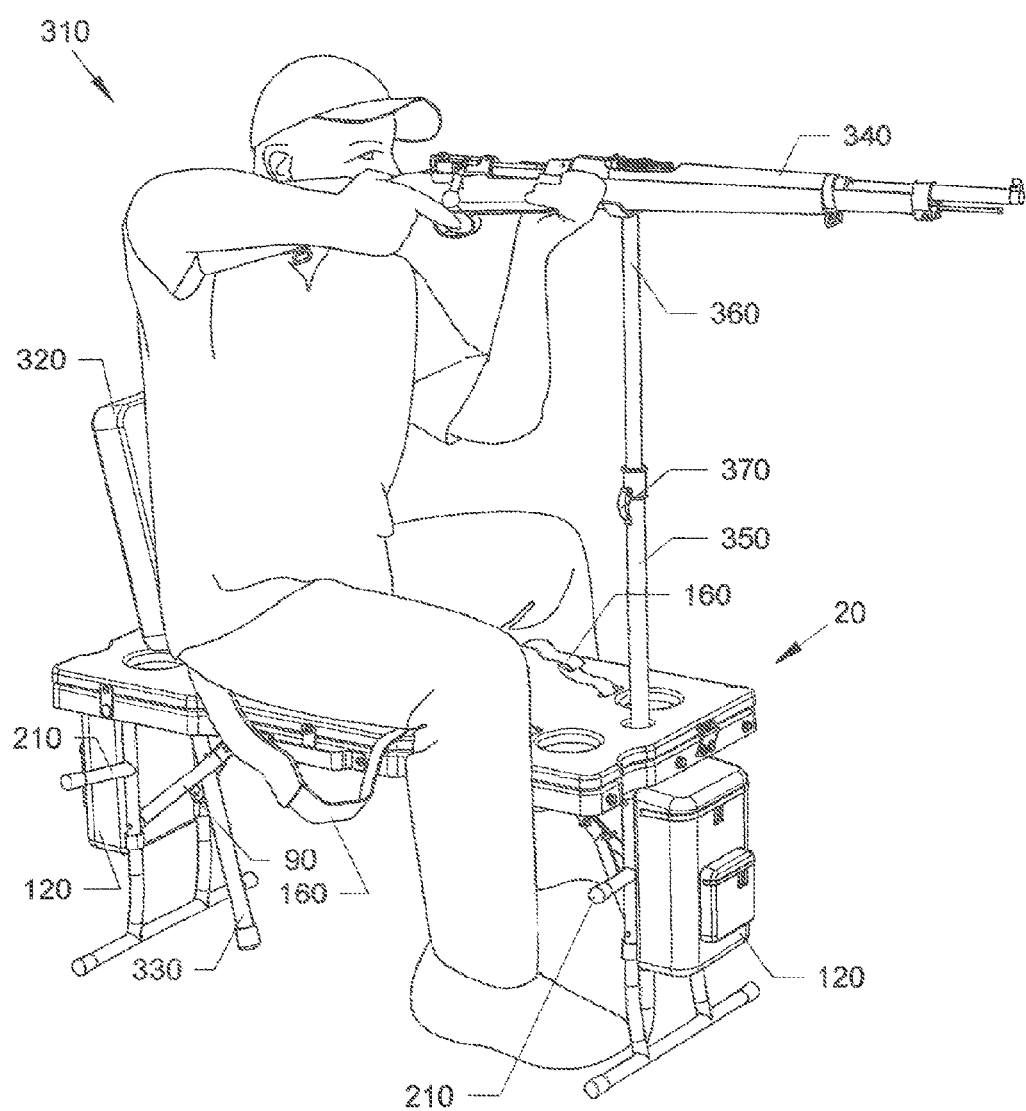

FIG. 6. is a view of a person 310 using a specially-arranged version of the second embodiment 20 after having mounted the gun rest 360 in it. It is inserted into support pole 350 and secured to the desired height by height adjustment means 370. Person 310, using rifle 340, may lean back against back rest cushion 320, which is in turn supported by back rest support pole 330.

Figure 7:
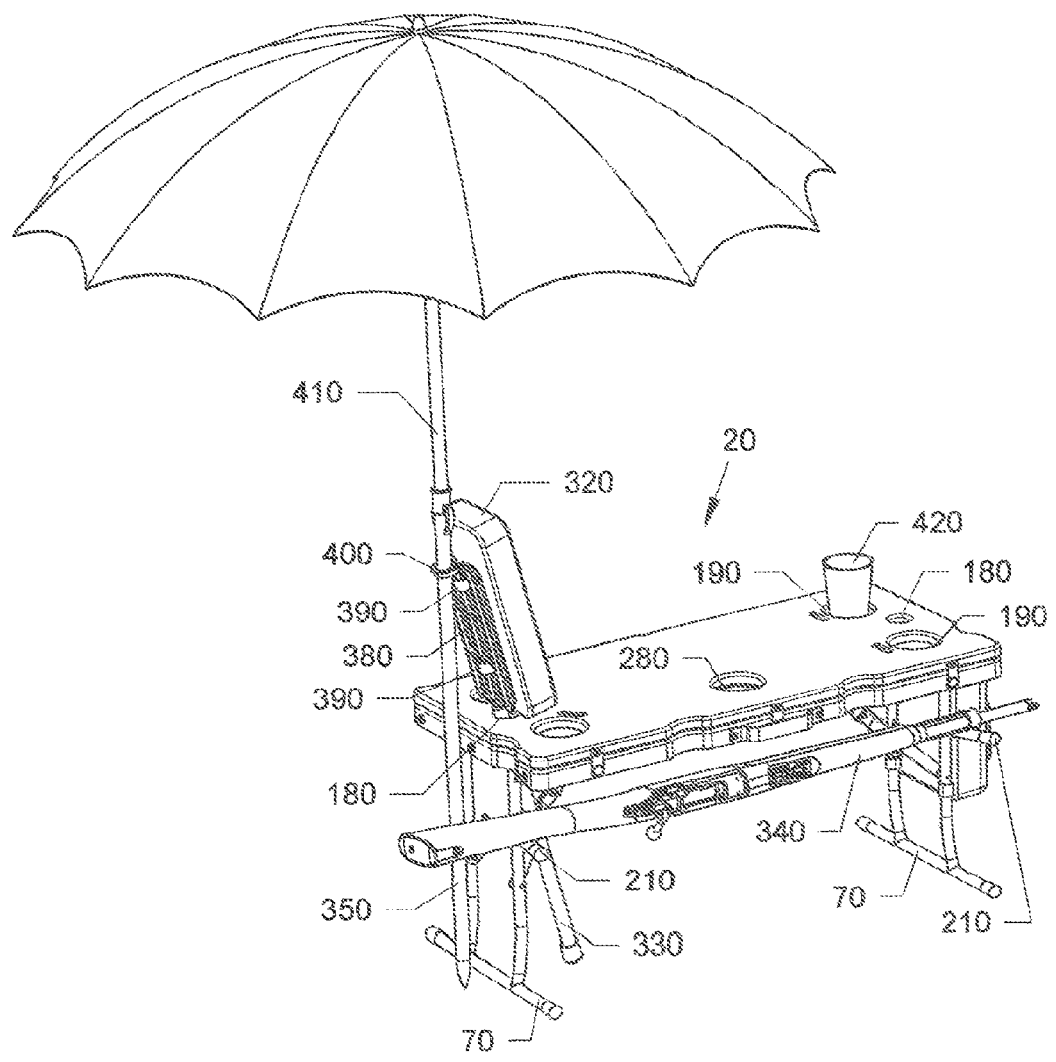

FIG. 7. is a perspective view of the special arrangement of the second embodiment shown in FIG. 6. Back rest frame 380 is visible from this angle, showing the accessory back rest cushion 320 secured to the frame 380 by straps 390. Frame 380 is supported in turn by support pole 330 passing through support port 180. A drink holder 190 (with cup 420) and an umbrella 410 are in use. Umbrella 410 is secured by accessory support loop 400. Note that rifle 340 is placed on struts 210.

Figure 8:
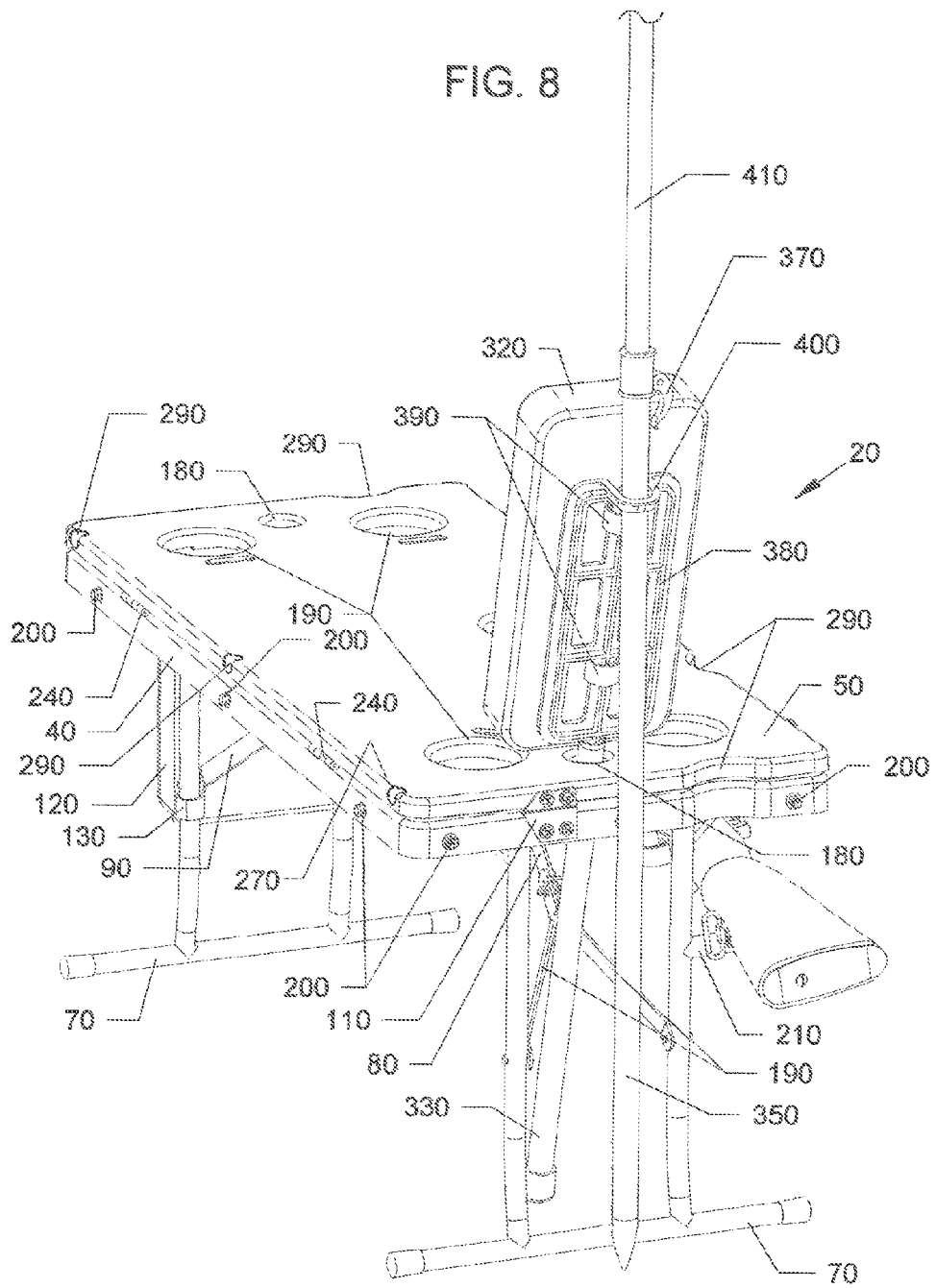

FIG. 8. is a rear detail of the special arrangement of the second embodiment shown in FIG. 7 highlighting the umbrella mounting as well as how the back rest support pole 330 nests between the leg struts 190 giving it stability.

Figure 9:
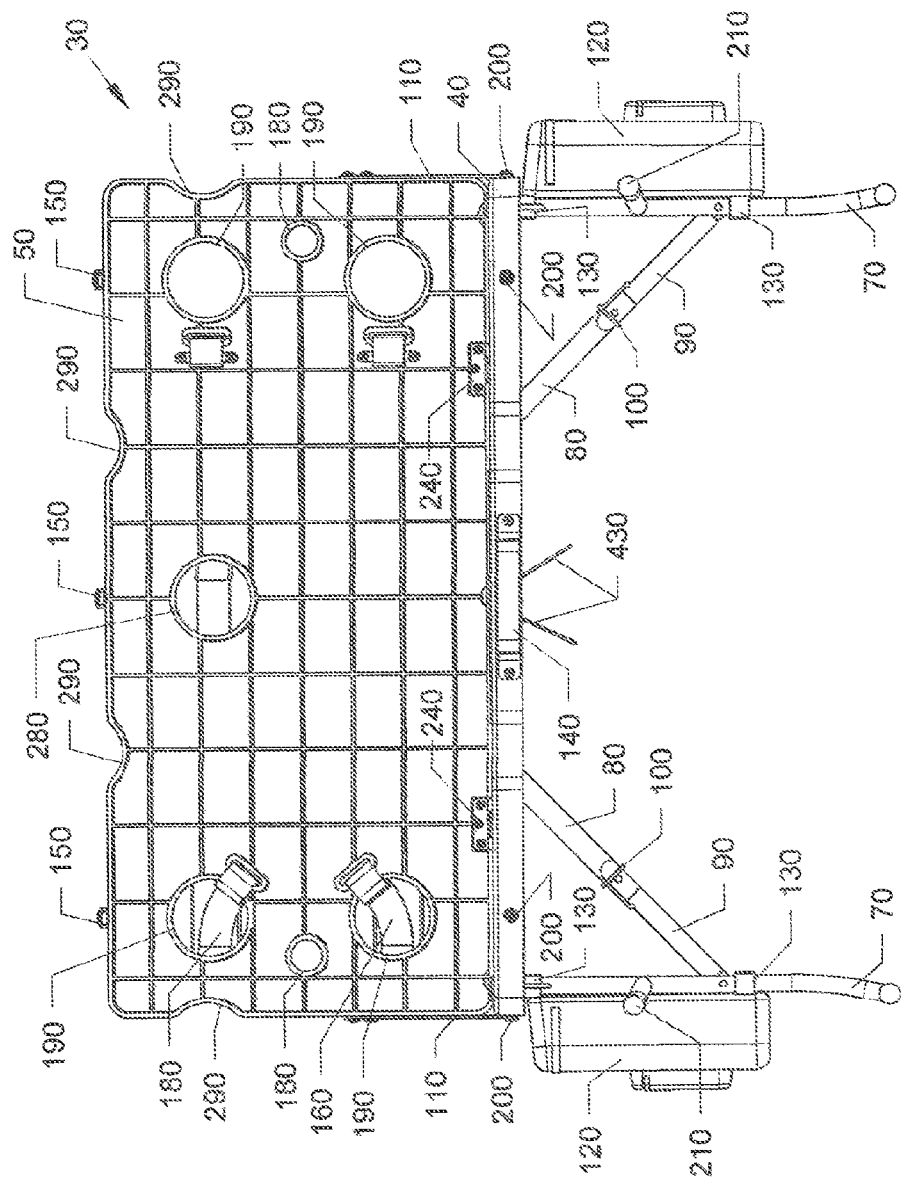

FIG. 9 is a front view of bench with the legs down and the bench-back up (third embodiment 30).

Figure 10:
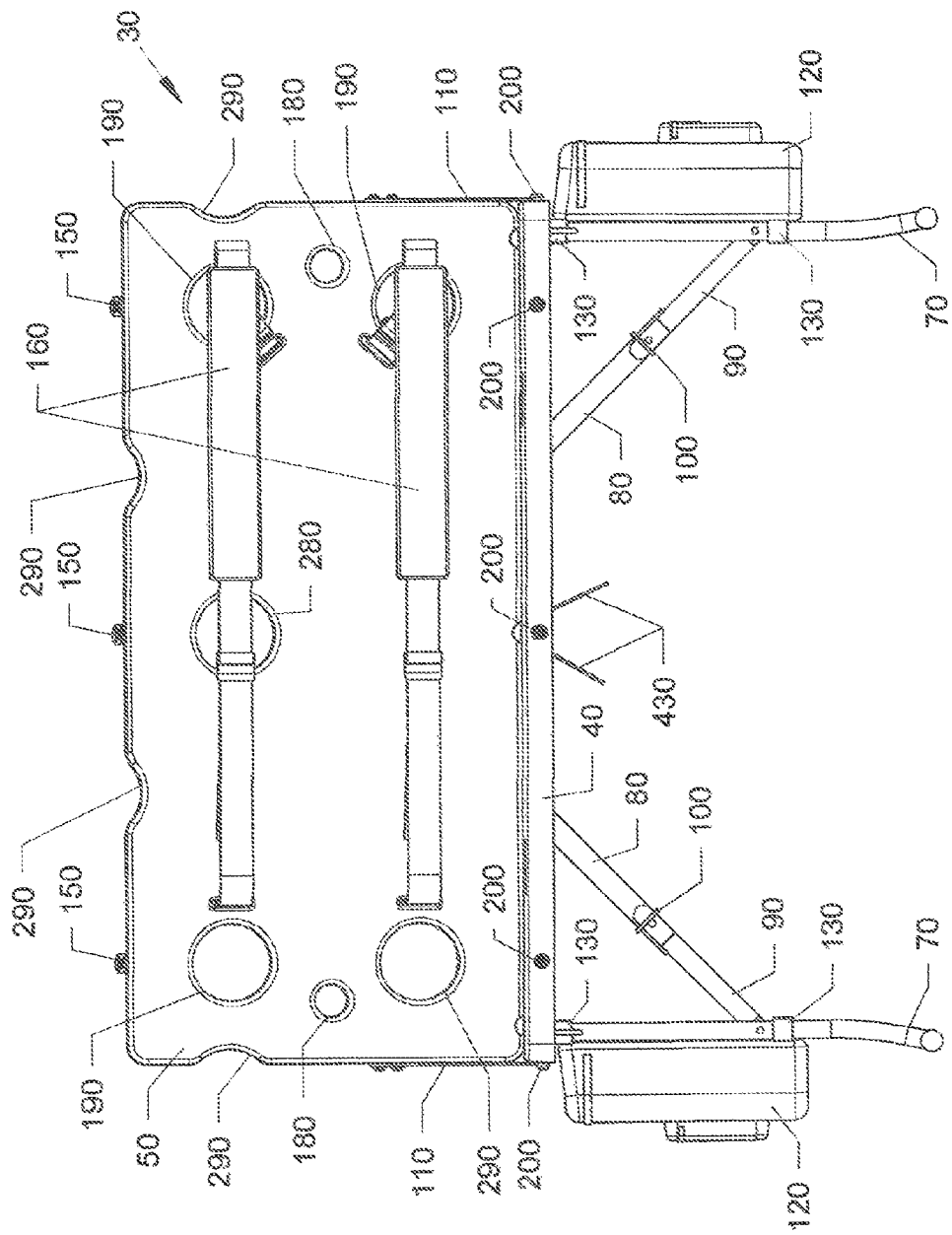

FIG. 10 is a rear view of third embodiment 30.

FIG. 11 is a side view of folded bench (first embodiment 10).

FIG. 12 is a side view of third embodiment 30.

Figure 13:
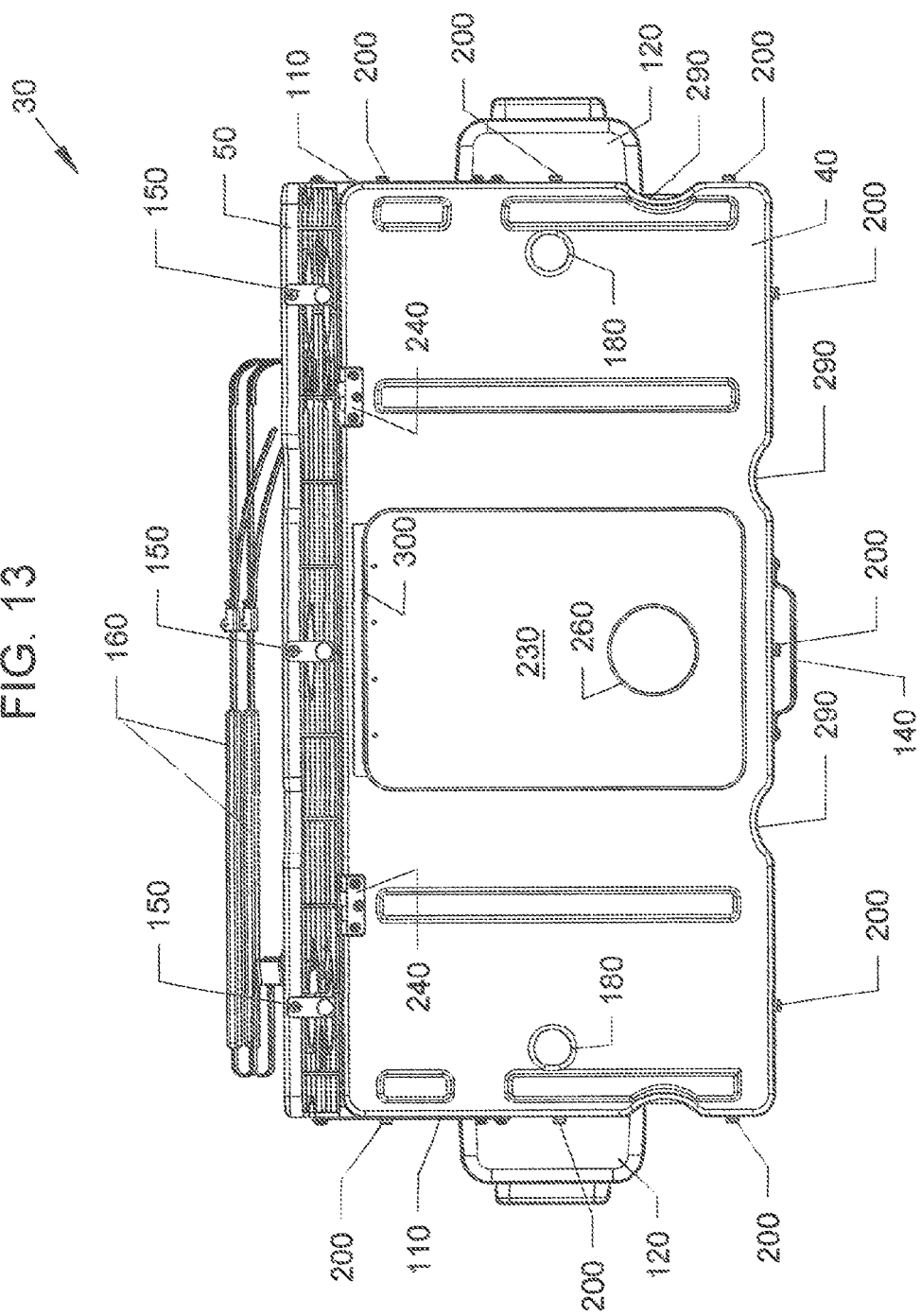

FIG. 13 is a top view of third embodiment 30.

Figure 14:
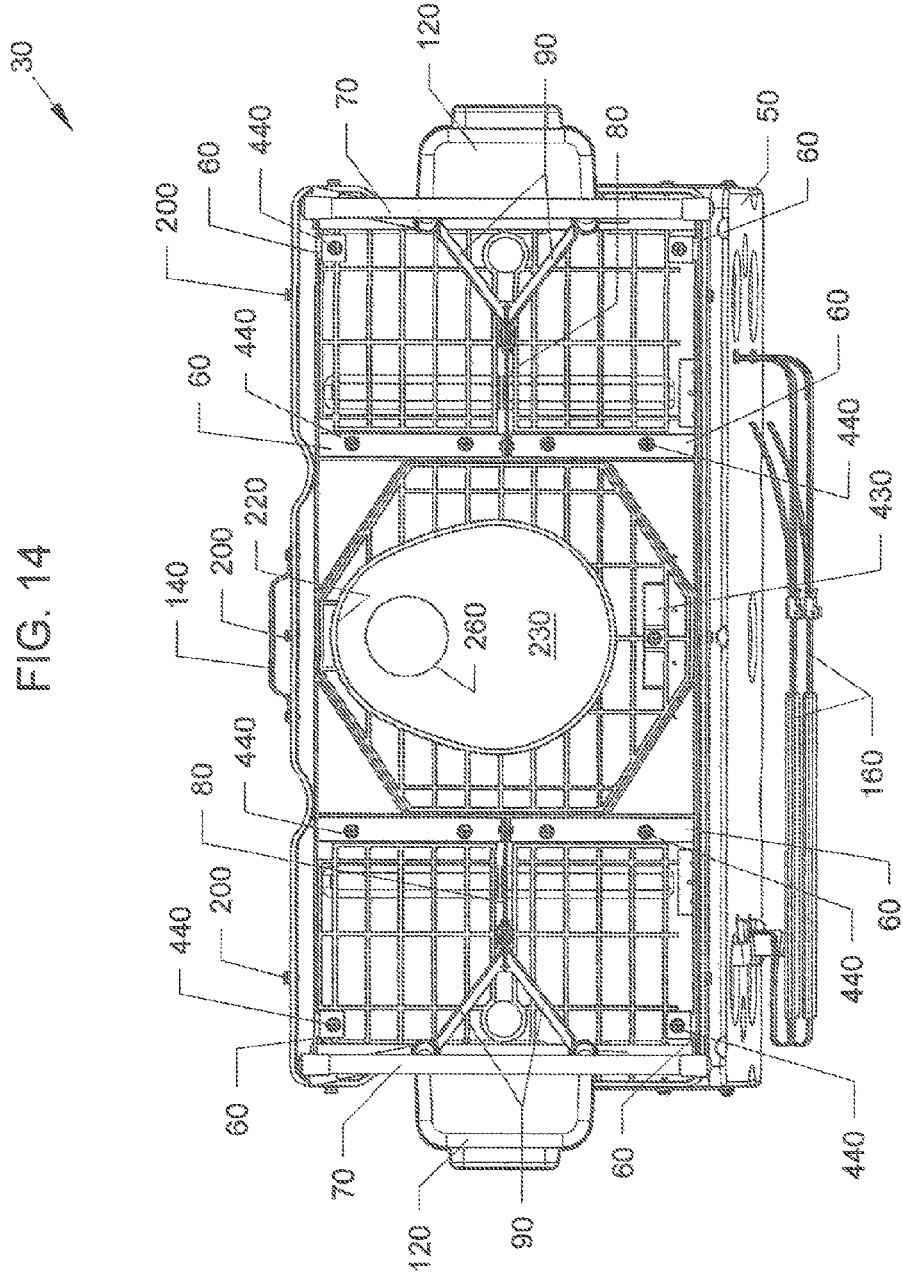

FIG. 14 is a bottom view of third embodiment 30 showing seat frame 60.

Figure 15:
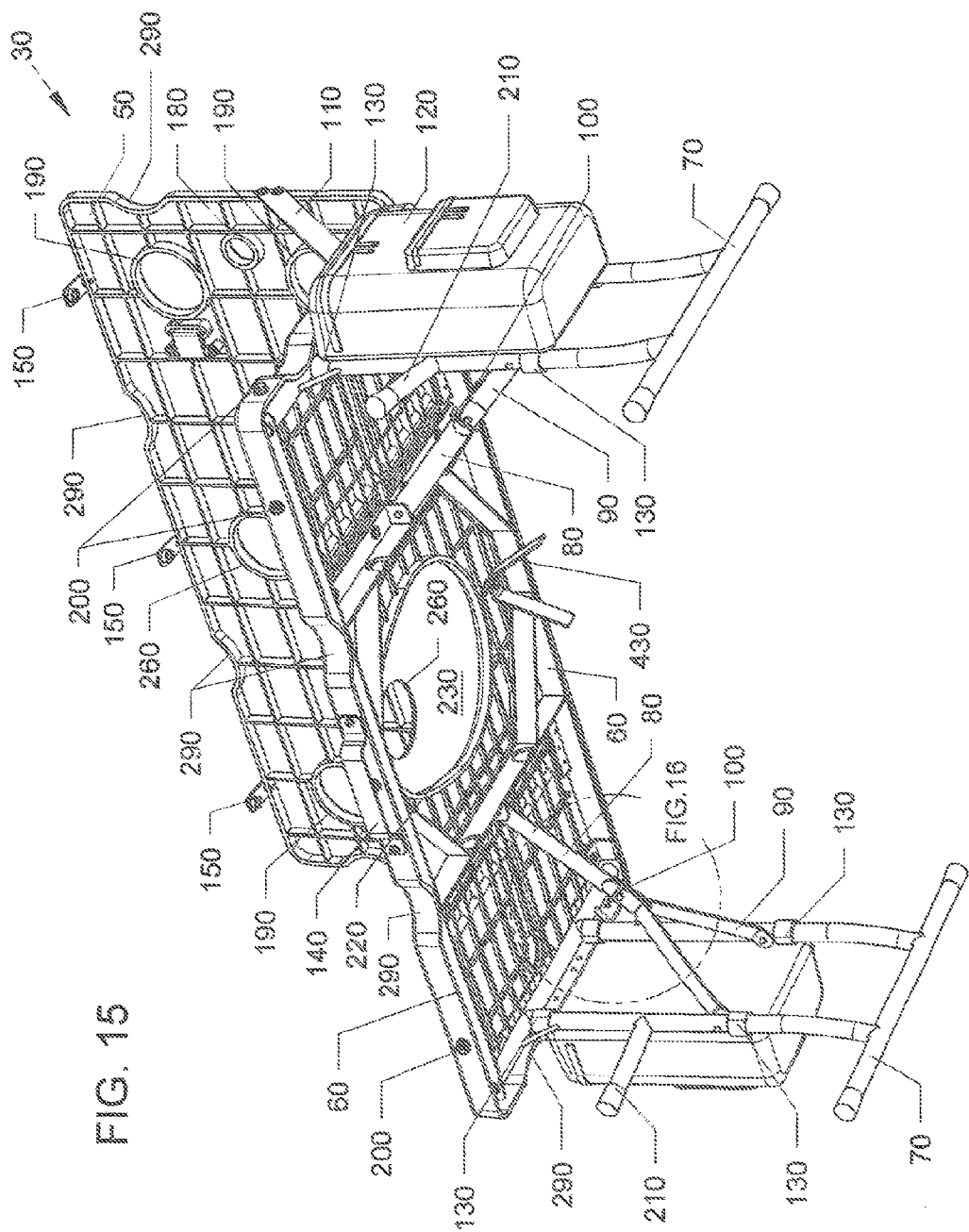

FIG. 15 is a bottom perspective view of the third embodiment 30. Leg securing straps 430 are visible in this view.

Figure 16:
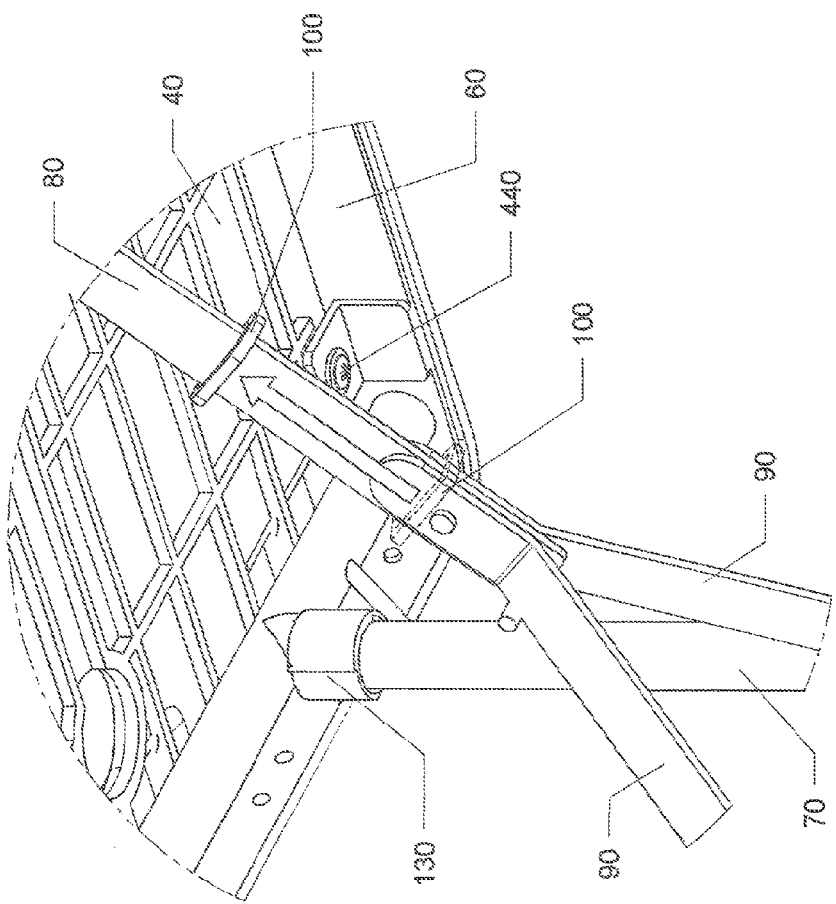

FIG. 16 is a detail of leg lock components. Frame mounting screw 440 is visible here.

Figure 17:
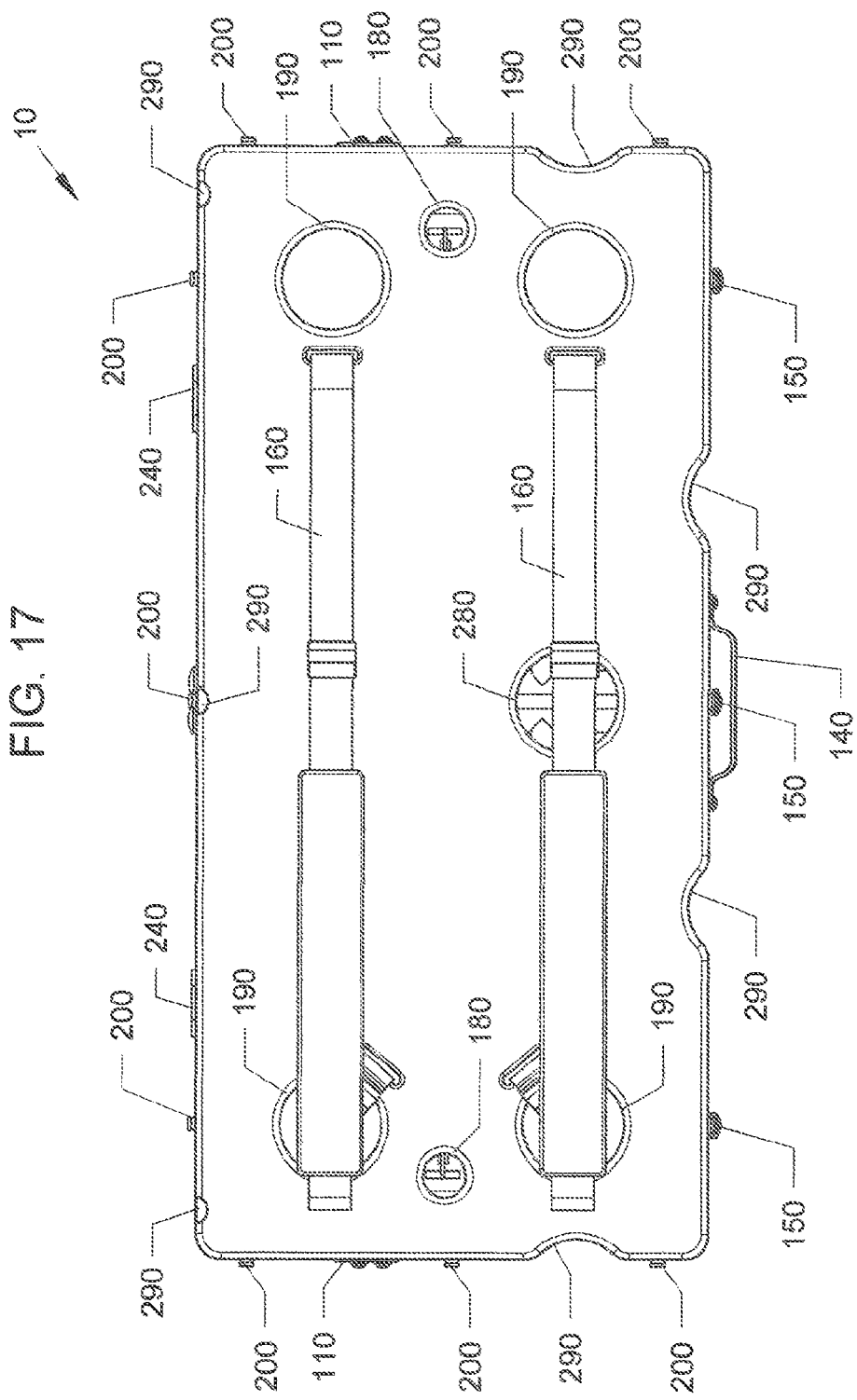

FIG. 17 is a top view of bench in folded configuration (first embodiment 10).

Figure 18:
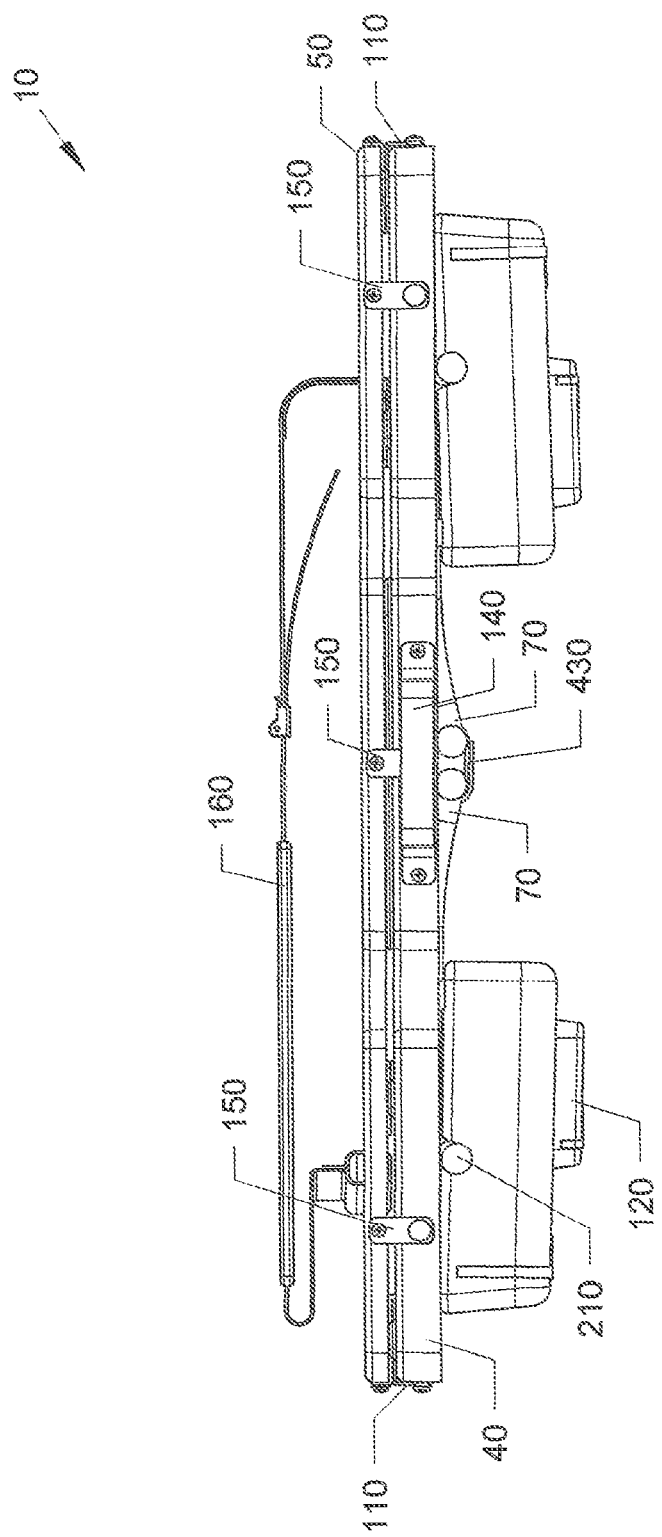

FIG. 18 is a front view of first embodiment 10.

Figure 19:
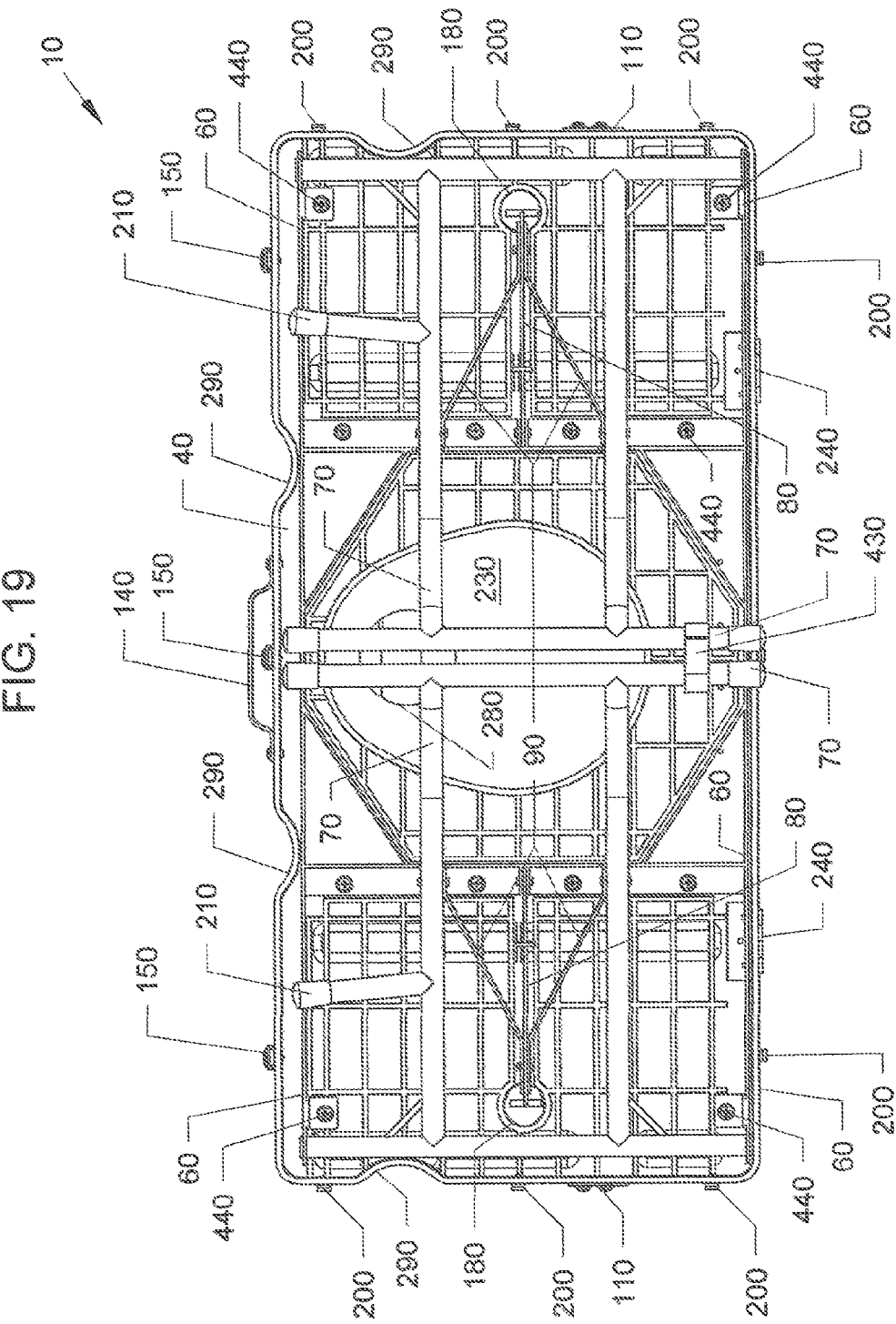

FIG. 19 is a bottom view of first embodiment 10.

FIG. 20 is a bottom perspective view of first embodiment 10.

FIG. 21 is a view showing the accessory support pole 350 and the gun rest support 360 apart.

FIG. 22 is a view showing the support pole 350 and the gun rest 360 assembled.

FIG. 23 is a view showing the back rest frame 380 and back rest cushion 320 apart.

FIG. 24 is a view showing the back rest frame 380 and back rest cushion 320 assembled.

FIG. 25 is a perspective view showing the accessory hunting blind 450 of the present invention draped over the special arrangement of the second embodiment shown in FIG. 7.

Figure 26:
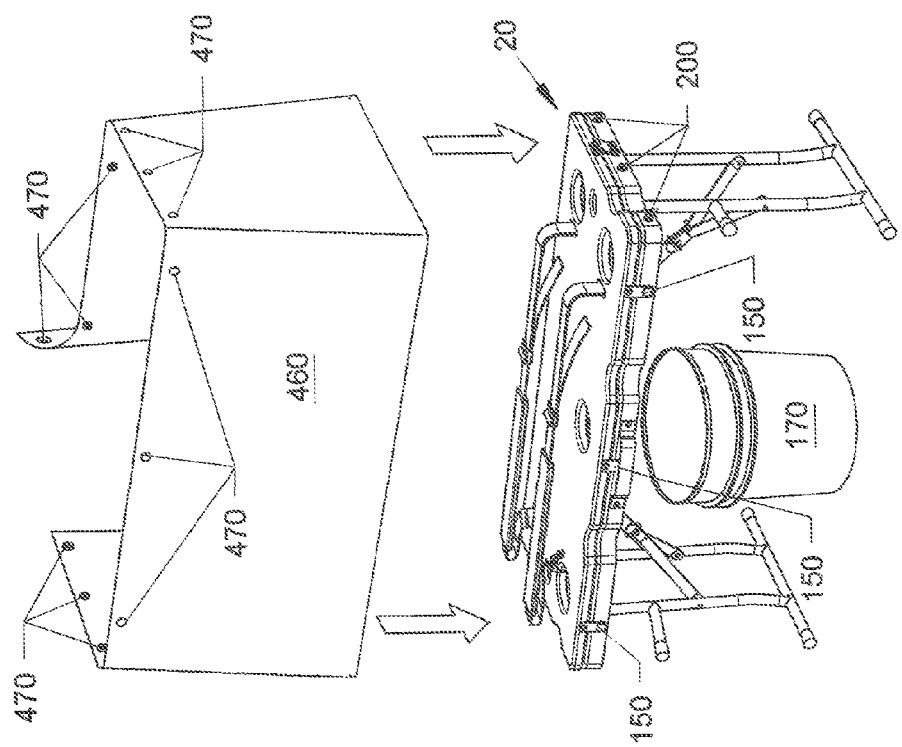

FIG. 26 is a perspective view showing the accessory skirt 460 ready to be assembled to the bench. The accessory skirt drapes over the bench and snaps to male snap fittings on bench seat (not shown) using female snap fittings 470 attached to skirt.

Figure 27:
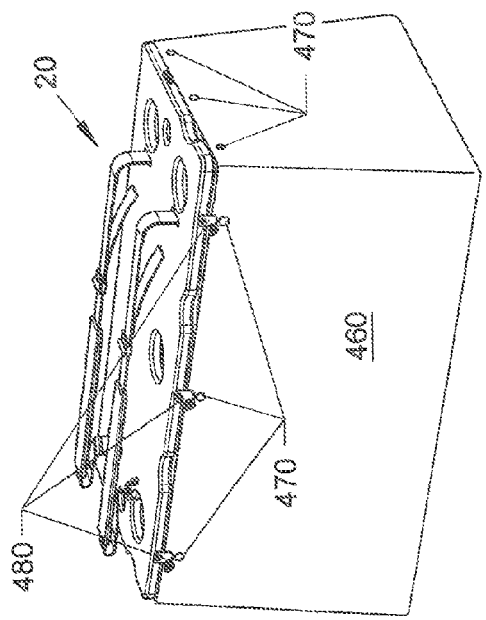

FIG. 27 is a perspective view showing skirt 460 assembled to second embodiment 20.

Figure 28:
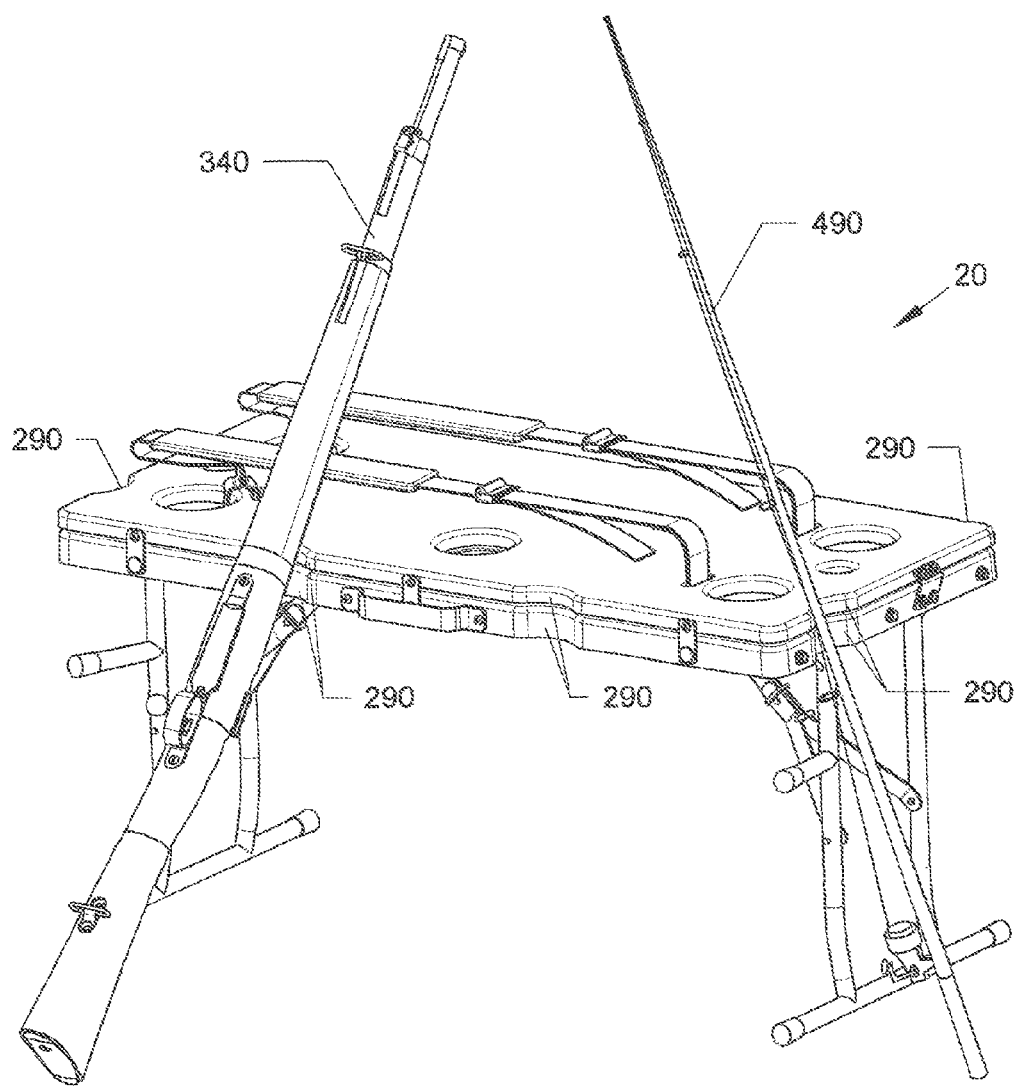

FIG. 28 is a perspective view showing a rifle 340 and a fishing pole 490 resting in the rests 290 cut into the bench.

It is clear from the above description and figures that there can be many uses in addition to those mentioned, such as for hobby work (e.g., providing a measuring and/or cutting surface, seating for gardening) and leisure (sunbathing, napping, outdoor eating) or whatever else the various possible arrangements bring to mind.

The invention claimed is:

1. A multiple use device, comprising:
   a bench seat and a bench back having a similar length, width and substantially rectangular periphery;
   the bench back hinged to the bench seat along the length;
   foldable legs for supporting the bench seat above the ground;
   means for securing the bench back flat against the seat;
   means for raising and maintaining the bench back to at least one non-zero angle about the hinge relative to the bench seat;
   snap fittings arrayed about the periphery to engage mating fittings on accessories;
   at least one accessory pole support port through the bench seat and bench back which lines up when the bench back is flat against the bench seat;
   at least one accessory pole;
   a cushion frame and a cushion attachable to at least one accessory pole;
   means for stabilizing the orientation of the at least one accessory pole below the at least one accessory pole support port;
   a toilet seat hole through the bench seat;
   a hinged toilet lid on top of the bench seat normally covering the toilet seat hole;
      the toilet lid having at least one lid cut-out hole coincident with the toilet seat hole; and
      the bench back having at least one bench back cut-out hole coincident with the lid cut-out hole.

2. The device of claim 1, further comprising:
   a skirt comprising mating snap fittings to engage said snap fittings on said periphery.

3. The device of claim 1, further comprising:
   an umbrella attachment; and
   a blind attachment shaped for engaging the umbrella attachment.

4. A multiple use device, comprising:
   a bench seat and a bench back having a similar length, width and substantially rectangular periphery;
   the bench back hinged to the bench seat along the length;
   foldable legs for supporting the bench seat above the ground;
   means for securing the bench back flat against the seat;
   means for raising and maintaining the bench back to at least one non-zero angle about the hinge relative to the bench seat;
   at least one accessory support pole;
   at least one pair of accessory pole support ports through said bench seat and said bench back which line up when said bench back is flat against said bench seat; and
   means for stabilizing the orientation of at least one accessory pole below at least one accessory pole support ports.

5. The device of claim 4, further comprising:
   a cushion frame and a cushion attachable to said at least one accessory pole.

6. The device of claim 4, further comprising:
   a toilet seat hole through said bench seat;
   a hinged toilet lid on top of said bench seat normally covering the toilet seat hole;
      the toilet lid having at least one lid cut-out hole coincident with the toilet seat hole; and
   said bench back having at least one bench back cut-out hole coincident with the lid cut-out hole.

* * * * *